United States Patent [19]

Chiang et al.

[11] Patent Number: 5,436,022
[45] Date of Patent: Jul. 25, 1995

[54] PROCESS FOR PRODUCING TOMATO PRODUCTS OF IMPROVED FLAVOR

[75] Inventors: Grace H. Chiang, Chatsworth, Calif.; Nicholas Melachouris, Monnaz, Switzerland; Anita N. Palag, Carson, Calif.; Elaine R. Wedral, Sherman, Conn.

[73] Assignee: Nestec S.A., Vevey, Switzerland

[21] Appl. No.: 349,585

[22] Filed: Dec. 5, 1994

[51] Int. Cl.⁶ .............................................. A23L 1/212
[52] U.S. Cl. ..................................... 426/626; 426/50; 426/380.5; 426/518; 426/520; 426/615; 426/655
[58] Field of Search ..................... 426/50, 330.5, 520, 426/518, 615, 626, 655

[56] References Cited

U.S. PATENT DOCUMENTS

| | | | |
|---|---|---|---|
| 1,021,770 | 4/1912 | Glacken | 426/615 |
| 3,250,630 | 5/1966 | Webster et al. | 426/615 |
| 3,366,490 | 1/1968 | Wagner et al. | 426/330.5 |
| 3,549,384 | 12/1970 | Walker et al. | 426/615 |

*Primary Examiner*—Helen Pratt

[57] ABSTRACT

Tomato based products, such as tomato puree, tomato paste, tomato sauce, and the like, having improved flavor characteristics, are produced by the modified hot break process of this invention. In this modified process whole tomatoes are subjected to an initial heating step which effects only limited heat penetration of the tomatoes. That is, whole tomatoes are blanched in water having a temperature above 185° F. (85° C.) for a short period of time to inactivate only those enzymes, primarily pectic enzymes, located at or near the surface of the tomatoes. Tomato enzymes located interior of the pericarp are not destroyed in this initial heating step. The tomatoes are then cooled to reduce the surface temperature of the tomatoes below about 110° F. (43° C.), and the cooled tomatoes are macerated in the presence of added alkali and a food grade alcohol, to provide a tomato slurry having a pH of between 4.7 and 5.1 and a temperature of below about 95° F. (35° C.). The tomato slurry is acidified to a normal tomato pH and the acidified slurry is then processed by conventional hot break procedures in which the slurry is heated to inactivate all enzymes and the slurry is pumped through a pulper and a finisher, and is then concentrated to a desired level of tomato solids. Tomato products produced by this invention have sweeter, more fruity, and less sour taste characteristics than tomato products produced by conventional hot break procedures.

9 Claims, No Drawings

PROCESS FOR PRODUCING TOMATO PRODUCTS OF IMPROVED FLAVOR

This invention relates to a process for producing tomato products, such as tomato puree, tomato paste, tomato sauce, and the like, having improved flavor characteristics. More particularly, the invention relates to a modified hot break process for the production of tomato products having sweeter, more fruity, and less sour flavor characteristics than products produced by conventional hot break procedures.

BACKGROUND OF THE INVENTION

Millions of tons of tomatoes are processed annually into a variety of tomato products, such as canned whole tomatoes, catsup, tomato paste, tomato puree, tomato sauce, and the like. During the short harvest season, which typically is about forty to sixty days long, the tomato industry processes raw tomatoes to both final products and partially processed products for storage and remanufacture. After harvesting, tomatoes must be quickly processed into the desired end product in order to avoid spoilage. In common practice, tomatoes are harvested at the pre-ripened stage so that the tomatoes retain a firm texture during handling and transport, in order to minimize spoilage. However, pre-ripened tomatoes lack the sweet and fruity characteristics of vine-ripened tomatoes.

It is recognized in the tomato processing industry that consistency is an important attribute of many products, including tomato juice and products prepared therefrom, such as paste, sauce, puree, catsup, etc. "Consistency" refers to the apparent viscosity of the product and the tendency of the product to hold its liquid portion without separation. To measure consistency, commercial tomato processors employ the Bostwick consistometer, which measures a flow property of a viscous tomato product. The operational aspects of the Bostwick consistometer are well known. Higher consistency in processed tomato products is perceived to represent better quality. In the processing of such tomato-based products it is recognized that product consistency is dependent upon the presence of pectic substances in the tomatoes, and may be controlled to some extent by the method of manufacture of the tomato based products. That is, two general commercial processes are employed in the manufacture of tomato products. In the "hot break" method, tomatoes are macerated at a temperature of 185° F. (85° C.) or higher to inactivate enzymes in the tomato, particularly pectin enzymes, such as pectin esterase and polygalacturonase. These pectic Enzymes are primarily responsible for the breakdown of pectic substances in the tomato, which results in undesirable low consistency of tomato products. In the "cold break" method, the tomatoes are macerated at some temperature below 185° F. (85° C.), at which pectin degrading enzymes remain active. In commercial practice the hot break process is used in the manufacture of tomato paste, puree, sauce, etc. where a thick consistency is desirable, while the cold break process is used for tomato products in which thick consistency is not a sales advantage.

Thus, conventional hot break processing of tomatoes successfully inactivates all tomato enzymes, including the pectin degrading enzymes, and thereby preserves consistency in the resulting product. However, since the hot break treatment effectively inactivates all tomato enzymes, including those responsible for the development of the desired sweet and fruity taste characteristic, of vine-ripened tomatoes, tomato products produced by the typical hot break process are commonly deficient in such desired flavor characteristics.

SUMMARY OF THE INVENTION

The present invention provides a modified hot break method for the processing of tomatoes which results in the production of tomato products having improved flavor. In accordance with the present process, the desired flavor characteristics of vine-ripened tomatoes are provided in tomato products produced from pre-ripened tomatoes by utilization of endogenous tomato enzymes under controlled conditions. In the process of this invention, whole tomatoes are first heated to effect only limited heat penetration of the tomatoes. That is, the tomatoes are heated under time-temperature conditions sufficient to inactivate only the pectic enzymes (pectin esterase and polygalacturonase) located at or near the surface of the tomatoes, primarily pectic enzymes only in the outer wall (pericarp) of the tomato. For is example, blanching the tomatoes by immersing whole tomatoes in hot water having a temperature above about 185° F. (85° C.), typically between about 190° to 210° F. (88° to 99° C.), for a shod period of time, e.g., about two minutes, inactivates the pectic enzymes located near the surface of the tomato but is not sufficient to destroy enzymes in portions of the tomato beneath the pericarp. Since heat penetration is limited to the outer wall portion of the tomatoes, intracellular enzymes are not inactivated.

After blanching, the tomatoes are cooled, such as by rinsing in cold water to reduce the surface temperature of the tomatoes to below about 110° F. (43° C.), and the cooled tomatoes are macerated in the presence of added alkali and a food grade alcohol, preferably ethanol. Due to the limited heat penetration in the heating step and the subsequent cooling of the heated tomatoes, the tomato slurry produced upon maceration of the whole tomatoes is at a temperature of below about 95° F. (35° C.). Generally, sodium hydroxide is preferred for use as the added alkali, but other edible alkalis may be used, such as potassium hydroxide, sodium or potassium carbonate, or the like. Sufficient alkali is added to the whole tomatoes to establish a pH in the tomato macerate of between about 4.7–5.1. Ethanol is added to the tomatoes at a level of between about 0.1 to 1% of the total tomato weight. The tomatoes may be macerated by any conventional procedure capable of breaking up or subdividing the tomatoes into a pulpy mass to ensure the release of tomato intracellular enzymes. In the maceration step the tomato material is mixed with the alkali and ethanol as the tomatoes are macerated, so that there is intimate contact between the alkali and ethanol with the tomato material, including both liquid and cellular particles, and the enzymes contained therein. Tomato enzyme reactions are virtually instantaneous.

The tomato slurry resulting from maceration of the tomatoes in the presence of added alkali and ethanol is acidified to a natural tomato pH, usually from 4.2–4.5, by the addition of an edible acid, preferably hydrochloric acid, and the acidified slurry is subsequently processed utilizing conventional hot break procedures for the production of tomato based products. That is, the slurry is heated to a temperature above about 185° F. (85° C.) for a time sufficient to inactivate all enzymes, typically 10–15 minutes, and the heated tomato slurry is pulped through a suitable screen to remove skin and seeds, is then pumped through a finishing screen. The resulting tomato slurry is concentrated to a desired level of tomato solids, typically to a minimum Brix of 8° to provide tomato puree, by convention procedures, such as suitable vacuum equipment, and may be either hot filled into cans or used directly for manufacturing tomato-based products such as tomato sauce, pizza sauce, catsup, etc.

Tomato products produced by the process of this invention have been found by sensory evaluation to have sweeter, more fruity, and less sour taste characteristics than tomato products produced by conventional hot break procedures. In addition, tomato products produced by this invention have a consistency suitable for commercial purposes.

DETAILED DESCRIPTION OF THE INVENTION

As noted hereinabove, tomatoes used in the commercial production of tomato based products are harvested at a pre-ripened stage so that the tomatoes have a firm texture during handling and transport to thereby minimize spoilage of the fruit. In general, the present invention is directed to improving the flavor characteristics of tomato products produced from preripened tomatoes. That is, the typical flavor characteristics of vine-ripened tomatoes are developed in tomato products produced from pre-ripened tomatoes by utilizing endogenous tomato enzymes during the processing.

Pectic enzymes, including pectin esterase and polygalacturonase, in tomatoes occur in greatest quantity near the surface of the tomatoes, with the pectic enzymes being located primarily in the epidermis and epicarp layers of the outer wall or pericarp, which extend to a depth of approximately between 0.0625 to 0.25 inches (1.6 to 6.4 mm) beneath the tomato skin.

In accordance with the present invention, whole tomatoes are subjected to an initial heating step to effect limited heat penetration of the surface of the tomatoes, so that only the pectic enzymes located near the surface of the tomato fruit are inactivated. In this initial heating step, the portion of the tomato interior of the epicarp layer of the outer wall, is not heated sufficiently to inactivate enzymes located therein. Such limited heat treatment of the tomatoes is effected by passing whole tomatoes through a steam or hot water blanch for a short period of time. Since pectic enzymes are inactivated at a temperature of 185° F. (85° C.) or higher, it is essential that this initial heating step be sufficient to heat the outer wall portion of the tomatoes to such temperature to a depth of between about 0.0625 to 0.25 inches (1.6 to 6.4 mm) beneath the skin of the tomatoes. This may be effected by immersing whole tomatoes in hot water having a temperature of at least 185° F. (85° C.), preferably between about 195° to 210° F. (88° to 99° C.) for approximately two minutes. Alternatively, surface pectic enzymes may inactivated by scalding whole tomatoes in steam. Because of the limited heat penetration of this initial heating step, those portions of the tomato interior of the pericarp are not heated sufficiently to destroy enzymes located therein, so that tomato enzymes located interior of the pericarp are preserved. Typically, upon completion of this initial heating step, the temperature close to the center of the tomatoes is near room temperature, i.e., below about 75° F. (24° C.).

Upon completion of the initial heating step the whole tomatoes are cooled such as by rinsing, immersion, etc. in cold water until the tomatoes are lukewarm, that is, the surface temperature of the tomatoes is reduced to below about 110° F. (43° C.). Since tomato enzyme reactions are temperature dependent, cooling of the tomatoes is carried out prior to maceration of the whole tomatoes in order to facilitate the occurrence, when the tomatoes are macerated, of reactions of enzymes which were not destroyed during the initial heat treatment. Cooling the surface of the tomatoes to such an extent provides a tomato macerate having a temperature of below about 95° F. (35° C.).

The cooled tomatoes are drained and macerated in the presence of added edible alkali and a food grade alcohol, preferably ethanol. The tomatoes may be macerated by any conventional procedure capable of chopping, crushing or otherwise subdividing the tomatoes into a pulpy mass of tomato material, both liquid and cellular material, with the release of intracellular tomato enzymes. In accordance with one embodiment, the cooled tomatoes are macerated in a Waring blender at medium speed for one minute. In order to accomplish the tomato flavor improvement of this invention, the tomatoes are macerated in the presence of added alkali and alcohol, so that there is intimate contact between the alkali and alcohol with the tomato material, including both liquid and cellular particles, as the tomatoes are macerated. The tomato macerate has a temperature below about 95° F. (35° C.). That is, the alkali and alcohol are added to the cooled whole tomatoes after the surface temperature of the tomatoes has been cooled to below about 95° F. (35° C.), so the particles of tomato material are in contact with the alkali and alcohol as they are formed upon disintegration. Tomato enzymes, other than pectic enzymes, which are not destroyed during the initial heat treatment of the tomatoes are released upon maceration of the tomatoes, with enzymatic reaction taking place virtually instantaneously when the tomatoes are broken.

Sufficient alkali is added to the tomatoes to establish a pH in the macerate of between about 4.7 to 5.1. The alcohol, which preferably is ethanol, is added to the whole tomatoes in an amount of between about 0.1 to 1.0% by weight of the weight of the tomatoes. Generally, sodium hydroxide is preferred for use as the added alkali because it is effective and subsequent neutralization of the tomato slurry with hydrochloric acid yields sodium chloride, a common additive in tomato products. Other edible alkalis capable of increasing the pH of the macerate to the desired level may, of course be used, such as potassium hydroxide, sodium or potassium carbonate, and the like.

After maceration of the tomatoes, the resulting tomato slurry is acidified to natural tomato pH, typically between about 4.2 to 4.5, by the addition of an edible acid to the slurry. Preferably hydrochloric acid is added, but other edible acids may of course be used, such as phosphoric, citric, malic, tartaric, etc. The acidified tomato slurry may be processed into a desired tomato product by conventional hot break tomato processing procedures, including, for example, heating the acidified slurry to a temperature above 185° F. (85° C.) for a period sufficient to inactivate all enzymes in the slurry, after which the hot slurry is passed through a pulper and a finisher to remove seeds and skins and reduce the slurry to a desired particle size. The resulting slurry is then concentrated to a desired level of tomato solids by any suitable evaporation equipment.

Any of the well known hot break heating procedures may be used, including direct steam injection, rotary coil kettles, and the like. In a preferred embodiment, the acidified tomato slurry is heated to 205° F. (96° C.) for 10–15 minutes to inactivate all enzymes in the slurry. The resulting slurry is then pumped through a pulping machine and a finishing machine, which typically are rotary mills provided with wire mesh screens or perforated plates through which the tomato solids are forced but which screen out seeds, stems and skin particles. The pulping machine typically is provided with a mesh screen with openings from about .060 to .095 inches (1.5 to 2.4 mm.), while the finishing machine typically is provided with a wire mesh screen having openings from about 0.020 to 0.050 inches (0.5 to 1.3 mm.). The resulting slurry is then concentrated to a desired level of tomato solids by any suitable evaporation equipment, such as vacuum evaporators capable of producing tomato puree having minimum of 8° Brix, preferably from 10° to 12° Brix. The resulting puree, when evaluated by a trained sensory panel was found to have a sweeter, more fruity and less sour taste than tomato puree produced using conventional hot break procedures.

The tomato puree thus produced may be hot filled into containers for storage and/or remanufacture, or may be used directly for the production of tomato-based products, such as tomato sauce, catsup, pizza sauce, spaghetti sauce, and the like.

The following examples are intended to illustrate more specific embodiments of the present invention without acting as a limitation on the scope thereof. Unless otherwise indicated, all parts and percentages are by weight.

EXAMPLE 1

A batch of raw whole tomatoes which are harvested at the pre-riped stage, are blanched in boiling water for 2 min. at a ratio of two parts water per one part tomato, to effect limited heat penetration of the tomatoes. That is, a layer approximately ⅛ inch (3.2 mm.) thick at the surface of the tomatoes is cooked and softened, with the temperature near the center of the blanched tomato being below about 75° F. (24° C.).

After blanching, the blanch water is discarded and the hot tomatoes are rinsed with cold water until the surface of the blanched tomatoes is lukewarm, i.e. below about 110° F. (43° C.).

The cooled whole tomatoes, together with 10 gm. 2N NaOH per 1 kg. tomatoes and from 1–10 gm. ethanol (95%) per 1 kg. tomatoes are placed in a Waring blender and the tomatoes macerated at 14 K rpm for 1 min. The tomato macerate thus produced has a pH in the range of 4.7–5.1 and a temperature below 95° F. (35° C.). After maceration, hydrochloric acid is added to the macerate in an amount of 7 gm. 2N HCl per 1 kg. tomatoes to bring the pH of the macerate back to normal tomato pH (4.2–4.5).

The acidified tomato slurry is then processed by a conventional hot break process in which the slurry is heated to 205° F. (96° C.) for 10–15 min. to inactivate all enzymes and the hot tomato slurry is pumped through a rotary pulping machine in which the slurry is passed through a 0.093 in. (2.4 mm.) mesh screen to remove the major portion of the seeds and other undesired tomato particles. The resulting slurry is then passed through a rotary finishing machine provided with a 0.045 in. (1.1 mm.) wire mesh screen. After leaving the finishing machine the slurry is concentrated in a vacuum evaporator at 150° F. (66° C.) to provide tomato puree having a Brix level of 12°.

Tomato puree produced by the procedure described above was evaluated by a sensory panel of 12 trained judges, with this product being identified as Sample A. In order to provide a basis for comparison, two additional samples, Samples B and C, were produced and evaluated. Sample B was produced by the procedure described above with the single exception that no ethanol was added to the tomatoes when macerated. That is the blanched and cooled tomatoes were macerated in the presence of only NaOH. Sample C was produced by the same procedure, but without the blanching step and without the addition of alkali and alcohol upon maceration. That is, this sample was produced by a conventional hot break process with no pretreatment of the tomatoes prior to the hot break step.

The three samples were evaluated under red light with the judges ranking their preference (1 being most preferred and 4 being the least preferred), and the perceived intensity of five descriptors. The results of this evaluation are set out below in Tables 1 and 2.

TABLE 1

| | Flavor Intensity | | | | |
| | Relative Intensity (0-none, 140-strong) | | | | |
| Sample | Sweetness | Sourness | Bitterness | Red, Ripe | Green, Viney |
| --- | --- | --- | --- | --- | --- |
| Sample A | 80 | 38 | 19 | 76 | 20 |
| Sample B | 75 | 44 | 19 | 82 | 32 |
| Sample C | 43 | 68 | 19 | 53 | 41 |

TABLE 2

| Sample | Preference (1-most preferred, 4-least preferred) |
| --- | --- |
| Sample A | 1.9 |
| Sample B | 2.1 |
| Sample C | 3.2 |

The results of this evaluation clearly show that the process of the present invention produces tomato products having improved flavor characteristics.

EXAMPLE 2

Even though only the pectic enzymes located at or near the surface of the tomatoes are inactivated by heating prior to maceration of the tomatoes, the tomato products produced by this invention have a consistency suitable for commercial purposes, as demonstrated by the following test, in which three varieties of tomatoes are utilized.. Tomato puree is produced from each of the three varieties utilizing the procedure described in producing Sample A in Example 1 above. These products are identified as "Invention". A second set of tomato puree products is prepared from each of the tomato varieties using the same procedure, but without the blanching step and without the addition of alkali and alcohol upon maceration. That is, these samples, which are identified as "Regular", are produced by a conventional hot break process with no pretreatment of the tomatoes prior to the hot break step. A third set of tomato puree products, identified as "Control", is prepared from each variety of tomatoes, with these samples being produced without pretreatment or hot break step.

The consistency of each of the samples is determined using a Bostwick consistometer, in which the sample being tested is poured into the compartment and leveled, and the extent of flow in cm. being measured 30 seconds after releasing the gate. The results of this testing is set out below in Table 3.

TABLE 3

| Tomato Variety | Consistency (cm/30 sec.) | | |
| --- | --- | --- | --- |
| | Invention | Control | Regular |
| A | 4.4 | 8.6 | 5.5 |
| B | 5.1 | 8.4 | 2.7 |
| C | 3.6 | 7.1 | 0.4 |

As shown by the results of this testing, tomato puree produced by the process of this invention has a higher consistency than puree produced with no blanching or hot break treatment, and is sufficiently high to be suitable for substantially the same commercial purposes as puree produced by conventional hot break procedures.

What is claimed is:

1. A process for producing tomato products having improved flavor characteristics which comprises
   heating the surface of whole tomatoes to a temperature sufficient to inactivate pectic enzymes only in the pericarp portion of the tomatoes,
   cooling the heated surfaces of the whole tomatoes,
   macerating the cooled tomatoes in the presence of added edible alkali and from about 0.1 to 1.0% by weight of the tomatoes of a food grade alcohol to form a tomato slurry containing intracellular enzymes released from the tomato, the alkali being present in an amount sufficient to provide the tomato slurry with a pH of between about 4.7–5.1,
   acidifying the tomato slurry to a natural tomato pH in the range of about 4.2 to 4.4,
   heating the acidified tomato slurry under conditions sufficient to inactivate substantially all tomato enzymes in said slurry,
   finishing the tomato slurry to a preselected particle size while removing seeds and skin therefrom, and
   concentrating the finished tomato slurry to a predetermined Brix level to thereby provide a tomato product having improved flavor characteristics.

2. The process defined in claim 1 in which the whole tomatoes are heated by immersion in hot water having a temperature above about 185° F. (85° C.) for a time sufficient to inactivate pectic enzymes in only the epidermis and epicarp layers of the pericarp.

3. The process defined in claim 2 in which the whole tomatoes are immersed in water having a temperature of about 190° to 210° F. (88° to 99° C.) for about two minutes.

4. The process defines in claim 2 in which pectic enzymes are inactivated to a depth of between about 0.0625 to 0.25 inches (1.6 to 6.4 mm.) beneath the surface of the tomatoes.

5. The process defined in claim 1 in which the heated tomatoes are cooled by to reduce the temperature of the tomato surface to an extent sufficient that the tomato slurry formed upon maceration of the whole tomatoes has a temperature of below about 95° F. (35° C.).

6. The process defined in claim 5 in which the heated tomatoes are cooled by rinsing in cold water to reduce the temperature of the outer wall of the tomatoes to below about 110° F. (43° C.).

7. The process defined in claim 1 in which the alkali is sodium hydroxide.

8. The process defines in claim 1 in which the alcohol is ethanol.

9. The process defined in claim 1 in which the tomato slurry is acidified by the addition thereto of hydrochloric acid.

* * * * *